US012113197B2

(12) United States Patent
Harada (10) Patent No.: US 12,113,197 B2
(45) Date of Patent: Oct. 8, 2024

(54) SECONDARY BATTERY (71) Applicant: Panasonic Intellectual Property Management Co., Ltd., Osaka (JP)

(72) Inventor: Tomohiro Harada, Osaka-fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 742 days.

(21) Appl. No.: 17/289,974

(22) PCT Filed: Oct. 23, 2019

(86) PCT No.: PCT/JP2019/041561
§ 371 (c)(1),
(2) Date: Apr. 29, 2021

(87) PCT Pub. No.: WO2020/090591
PCT Pub. Date: May 7, 2020

(65) Prior Publication Data
US 2022/0006069 A1 Jan. 6, 2022

(30) Foreign Application Priority Data

Oct. 30, 2018 (JP) ................. 2018-204247

(51) Int. Cl.
*H01M 4/131* (2010.01)
*H01M 4/02* (2006.01)
(Continued)

(52) U.S. Cl.
CPC ........... *H01M 4/131* (2013.01); *H01M 4/386* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 10,673,046 B2 * 6/2020 Dadheech ........... H01M 50/446
10,784,506 B1 * 9/2020 Snyder ................. H01M 50/46
(Continued)

FOREIGN PATENT DOCUMENTS

JP 2005-174655 A 6/2005
JP 2006-114256 A 4/2006
(Continued)

OTHER PUBLICATIONS

PTO Machine Translation of WO 2015/011884 A1 (Year: 2015).*
(Continued)

*Primary Examiner* — Kevin M Bernatz
(74) *Attorney, Agent, or Firm* — WHDA, LLP (57) ABSTRACT

A secondary battery including a positive electrode including a positive electrode active material capable of electrochemically absorbing and releasing lithium ions, a negative electrode including a negative electrode active material capable of electrochemically absorbing and releasing lithium ions, a separator interposed between the positive and negative electrodes, and a non-aqueous electrolyte. The positive electrode includes a positive electrode material mixture containing the positive electrode active material and a positive electrode additive. The positive electrode additive includes a compound represented by $Li_aFe_xM_yO_z$, where $0 \leq a \leq 5$, $0 \leq x \leq 5$, $0 \leq y \leq 1$, and $0 \leq z \leq 4$, with at least two of a, x, y and z being more than 0, and M includes at least one kind selected from the group consisting of Mn, Zn, Al, Ga, Ge, Ti, Si, Sn, Ce, Y, Zr, S, and Na.

14 Claims, 3 Drawing Sheets (51) Int. Cl.
  *H01M 4/38* (2006.01)
  *H01M 4/505* (2010.01)
  *H01M 4/525* (2010.01)
  *H01M 4/62* (2006.01)
  *H01M 10/0525* (2010.01)
  *H01M 10/0587* (2010.01)
  *H01M 50/469* (2021.01)

(52) U.S. Cl.
  CPC ....... *H01M 4/621* (2013.01); *H01M 10/0525* (2013.01); *H01M 10/0587* (2013.01); *H01M 50/469* (2021.01); *H01M 2004/028* (2013.01)

(56) References Cited

U.S. PATENT DOCUMENTS

| | | | | |
|---|---|---|---|---|
| 2006/0134520 | A1* | 6/2006 | Ishii | H01M 4/62 429/231.95 |
| 2009/0061304 | A1* | 3/2009 | Muraoka | H01M 50/00 429/163 |
| 2009/0117463 | A1 | 5/2009 | Takezawa et al. | |
| 2016/0069505 | A1* | 3/2016 | Yuasa | B01J 20/186 252/62 |
| 2017/0005302 | A1* | 1/2017 | Muroi | H01M 50/562 |
| 2017/0018748 | A1* | 1/2017 | Matsuura | H01M 50/317 |
| 2017/0077465 | A1* | 3/2017 | Taniguchi | B32B 1/00 |
| 2018/0205047 | A1* | 7/2018 | Ogihara | H01M 50/121 |
| 2019/0393487 | A1* | 12/2019 | He | H01M 10/4235 |
| 2020/0251732 | A1* | 8/2020 | Ryoshi | H01M 50/46 |
| 2020/0266413 | A1* | 8/2020 | Chae | H01M 4/1393 |
| 2020/0313180 | A1* | 10/2020 | Ryoshi | H01M 4/131 |

FOREIGN PATENT DOCUMENTS

| | | |
|---|---|---|
| JP | 2007-287446 A | 11/2007 |
| JP | 2009-135084 A | 6/2009 |
| JP | 2018-18785 A | 2/2018 |
| WO | WO-2015011884 A1 * | 1/2015 .......... H01M 10/052 |

OTHER PUBLICATIONS

International Search Report dated Jan. 21, 2020, issued in counterpart International Application No. PCT/JP2019/041561 (9 pages, including Japanese original and English translation).

* cited by examiner

SECONDARY BATTERY

TECHNICAL FIELD

The present invention relates to a secondary battery.

BACKGROUND ART

With recent development of portable electrical equipment with more sophisticated performance, secondary batteries used for its power source are required to have a higher capacity.

Patent Literature 1 discloses a lithium-containing transition metal oxide having a structure in which oxygen is tetracoordinated to a transition metal ion (hereinafter, an antifluorite-type oxide) to be included in a positive electrode. The antifluorite-type oxide has a large charge capacity, which is utilized to compensate the irreversible capacity of the negative electrode, and this can suppress the decrease in battery capacity along with a decrease in utilization rate of the positive electrode active material due to the irreversible capacity of the negative electrode.

CITATION LIST

Patent Literature

[PTL 1] Japanese Laid-Open Patent Publication No. 2007-287446

SUMMARY OF INVENTION

Technical Problem

The antifluorite-type oxide releases lithium ions during charge. At this time, the antifluorite-type oxide tends to decompose, which is likely to be accompanied by the generation of oxygen. When oxygen stays in the battery, the safety and the cycle characteristics of the battery may deteriorate.

Solution to Problem

In view of the above, one aspect of the present invention relates to a secondary battery, including: a positive electrode including a positive electrode active material capable of electrochemically absorbing and releasing lithium ions; a negative electrode including a negative electrode active material capable of electrochemically absorbing and releasing lithium ions; a separator interposed between the positive electrode and the negative electrode; and a non-aqueous electrolyte, wherein the positive electrode includes a positive electrode material mixture containing the positive electrode active material and a positive electrode additive, the positive electrode additive includes a compound represented by a general formula: $Li_aFe_xM_yO_z$, where $0 \le a \le 5$, $0 \le x \le 5$, $0 \le y \le 1$, and $0 \le z \le 4$, with at least two of a, x, y and z being more than 0, and M includes at least one kind selected from the group consisting of Mn, Zn, Al, Ga, Ge, Ti, Si, Sn, Ce, Y, Zr, S, and Na, and a deoxidizing agent is placed inside the secondary battery.

Advantageous Effects of Invention

According to the present invention, a secondary battery having a high capacity and being excellent in the safety and the cycle characteristics can be provided.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

A secondary battery according to one embodiment of the present invention includes a positive electrode including a positive electrode active material capable of electrochemically absorbing and releasing lithium ions, a negative electrode including a negative electrode active material capable of electrochemically absorbing and releasing lithium ions, a separator interposed between the positive electrode and the negative electrode, and a non-aqueous electrolyte.

The positive electrode includes a positive electrode material mixture containing the positive electrode active material and a positive electrode additive. The positive electrode additive includes, for example, at least one of a lithium-iron-containing oxide and a decomposition product thereof. When producing a positive electrode (before initial charge), it is preferable to include a lithium-iron-containing oxide in the positive electrode material mixture, in order to control the irreversible capacity. The lithium-iron-containing oxide may have an antifluorite-type crystal structure. During charge, lithium is released from the lithium-iron-containing oxide, and this contributes to the control of the irreversible capacity. At this time, at least part of the lithium-iron-containing oxide decomposes, to generate oxygen.

The positive electrode additive includes a compound represented by a general formula (1): $Li_{a1}Fe_{x1}M_{y1}O_{z1}$. In the formula (1), a1, x1, y1 and z1 satisfy $0 \le a1 \le 5$, $0 \le x1 \le 5$, $0 \le y1 \le 1$, and $0 \le z1 \le 4$, and at least two of a1, x1, y1 and z1 are more than 0. In the formula (1), M includes at least one kind selected from the group consisting of Mn, Zn, Al, Ga, Ge, Ti, Si, Sn, Ce, Y, Zr, S, and Na. For suppressing the gas generation and the like, M preferably includes at least one of Mn and Al.

The lithium-iron-containing oxide represented by the general formula (1) may further satisfy a general formula (2): $Li_{a2}Fe_{x2}M_{y2}O_{z2}$. In the formula (2), a2, x2, y2 and z2 satisfy $0 \le a2 \le 5$, $0 \le x2 \le 5$, $0 \le y2 \le 1$, and $1 \le z2 \le 4$. The lithium-iron-containing oxide represented by the general formula (2) is exemplified by $Li_5FeO_4$. With a large charge capacity that the lithium-iron-containing oxide has, the irreversible capacity of the negative electrode can be compensated, and this can suppress the decrease in battery capacity associated with a decrease in utilization rate of the positive electrode active material due to the irreversible capacity of the negative electrode.

The content of the positive electrode additive in the positive electrode material mixture is preferably 0.1 mass % or more and 5 mass % or less, with respect to the total mass of the positive electrode material mixture. When the content of the positive electrode additive in the positive electrode material mixture is 0.1 mass % or more with respect to the total mass of the positive electrode material mixture, the decrease in battery capacity due to the irreversible capacity of the negative electrode can be sufficiently suppressed. When the content of the positive electrode additive in the positive electrode material mixture is 5 mass % or less with respect to the total mass of the positive electrode material mixture, much more positive electrode active material can be included in the positive electrode material mixture, tending to result in a high capacity and excellent cycle characteristics. When producing a positive electrode, it is preferable to include a lithium-iron-containing oxide as the positive electrode additive in the positive electrode material mixture, in the range of 0.1 mass % or more and 5 mass % or less with respect to the total mass of the positive electrode material mixture. In this case, at least a lithium-iron-containing oxide is included in the battery before initial charge. The content of the positive electrode additive in the positive electrode material mixture can be determined by, for example, X-ray diffractometry (XRD) or Moessbauer spectroscopy.

The positive electrode material mixture may contain at least one kind selected from the group consisting of $Li_5FeO_4$, $Li_4Fe_4$, $LiFeO_2$, $Li_2O$, and $FeO_2$, as the positive electrode additive. In the case where $Li_5FeO_4$ is included as the positive electrode additive when producing a positive electrode (before initial charge), a decomposition product of the lithium-iron-containing oxide after initial charge includes, for example, at least one kind selected from the group consisting of $Li_4Fe_4$, $LiFeO_2$, $Li_2O$, and $FeO_2$.

A deoxidizing agent is placed inside the above-described secondary battery. The deoxidizing agent may be a material that reacts with oxygen generated in the battery and may be a material that absorbs or adsorbs the oxygen. That is, the deoxidizing agent may be any material that can suppress the increase in battery internal pressure due to oxygen. By placing the deoxidizing agent, the oxygen generated by the decomposition of the positive electrode additive (lithium-iron-containing oxide) during charge is less likely to stay in the battery, which can improve the safety of the battery and suppress the deterioration of the cycle characteristics.

In view of ensuring the reliability of the secondary battery, the deoxidizing agent preferably includes at least one kind selected from the group consisting of a cerium oxide, a zeolite, and a Ca—Si alloy (hereinafter, cerium oxide etc.). The cerium oxide etc. are a material that absorbs (adsorbs) oxygen. The cerium oxide etc., when absorbing oxygen, do not produce any compound, such as water, that affects the secondary battery. The cerium oxide etc. do not require other materials, such as water, when absorbing oxygen.

Preferred among them is a cerium oxide in terms of its excellent oxygen absorption capacity. The cerium oxide is represented by, for example, a general formula (3): $CeO_{2-x}$, where $0<x<2$. The oxygen deficiency of the cerium oxide contributes to the oxygen absorption capacity. In view of further improving the oxygen absorption capacity, x in the formula (3) may satisfy $0.1 \leq x < 2$. In view of mass productivity, cost, and the like, x in the formula (3) preferably satisfies $0.2 \leq x \leq 0.4$ (e.g., $CeO_{1.75}$).

An atomic ratio: Ce/Fe of Ce contained in the cerium oxide in the battery to Fe contained in the positive electrode additive in the positive electrode material mixture is, for example, 0.1 or more and 80 or less, and may be 0.9 or more and 50 or less. In this case, the decrease in battery capacity due to the irreversible capacity of the negative electrode and the oxygen stay in the battery can be suppressed in a balanced manner. The amount of Fe contained in the positive electrode additive in the positive electrode mixture and the amount of Ce contained in the cerium oxide in the battery are determined by, for example, an inductively coupled plasma atomic emission spectroscopy (ICP-AES).

A deoxidizing resin is preferably placed inside the secondary battery. The deoxidizing resin contains a resin that allows oxygen to pass through and the deoxidizing agent dispersed in the resin. The deoxidizing agent that is highly reactive with oxygen, such as a cerium oxide, is preferably dispersed in the resin. By dispersing the deoxidizing agent in the resin, the safety and the ease of handing tends to be enhanced. Moreover, the oxygen absorption rate can be easily controlled. The resin is preferably a material being chemically stable and capable of stably holding the deoxidizing agent. The deoxidizing resin may include a resin that can be used for a separator, such as a polyolefin. The deoxidizing resin may include a resin that can be used for a binder in the electrode material mixture.

The deoxidizing resin may be dispersed in the positive electrode material mixture. In this case, the content of the deoxidizing resin in the positive electrode material mixture is preferably 1 mass % or more and 10 mass % or less with respect to the total mass of the positive electrode active material in the positive electrode material mixture. When the content of the deoxidizing resin in the positive electrode material mixture is 1 mass % or more with respect to the total mass of the positive electrode active material, the oxygen stay in the battery can be effectively suppressed. When the content of the deoxidizing resin in the positive electrode material mixture is 10 mass % or less with respect to the total mass of the positive electrode active material, the amount of the positive electrode active material tends to be sufficient in the positive electrode material mixture, and the capacity and the cycle characteristics of the battery tends to be improved.

The deoxidizing resin can be dispersed in the positive electrode material mixture by, for example, preparing a positive electrode slurry containing a positive electrode active material, a deoxidizing resin, and a dispersion medium, and applying the slurry onto a surface of a positive electrode current collector, followed by drying to remove the dispersion medium. The positive electrode slurry may further contain one or more other components, such as a binder. In view of controlling the oxygen absorption rate, the deoxidizing resin preferably includes a resin that hardly dissolves in the dispersion medium (e.g., N-methyl-2-pyrrolidone) in the positive electrode slurry. Examples of such a resin include polyetheretherketone (PEEK), polytetrafluoroethylene (PTFE), and polypropylene.

The deoxidizing resin may be supported on a surface of the positive electrode or the separator. The deoxidizing resin may be supported continually or intermittently on a surface of the positive electrode or the separator. The deoxidizing resin may be supported on one surface or both surfaces of the positive electrode. Likewise, the deoxidizing resin may be supported on one surface or both surfaces of the separator. Preferably, the deoxidizing resin is supported on a surface facing the positive electrode of the separator.

The deoxidizing resin can be supported on a surface of the positive electrode or the separator, for example, in the following way.

A dispersion of a deoxidizing agent which contains a resin solution and the deoxidizing agent dispersed in the resin (hereinafter sometimes referred to as a deoxidizing agent-containing resin solution) is prepared. The resultant dispersion is applied onto the positive electrode or the separator, followed by drying to remove the solvent in the resin solution. Thus, a deoxidizing resin layer is formed on a surface of the positive electrode or the separator. By removing the solvent, a porous deoxidizing resin layer can be formed, which allows for smooth migration of lithium ions between the positive electrode and the non-aqueous electrolyte. The resin dissolved in the resin solution can serve to control the oxygen absorption rate and can also serve as a binder acting to attach the deoxidizing agent to the surface of the positive electrode or the separator. Examples of the application method include gravure coating, spray coating, die coating, roll coating, dip coating, and screen printing.

Also, other than the aforementioned deoxidizing agent-containing resin solution, a dispersion of a deoxidizing resin which contains a dispersion medium and the deoxidizing resin dispersed in the dispersion medium may be used. In this case, the deoxidizing resin includes a resin that hardly dissolves in the dispersion medium. The dispersion of a deoxidizing resin may be applied onto the positive electrode or the separator, followed by drying to remove the dispersion medium, so that the deoxidizing resin is supported on a surface of the positive electrode or the separator. Examples of the dispersion medium include water and an alcohol. The dispersion medium may be added with a binder, for the purpose of allowing the deoxidizing resin to be more reliably supported on a surface of the positive electrode or the separator.

Figure 1:
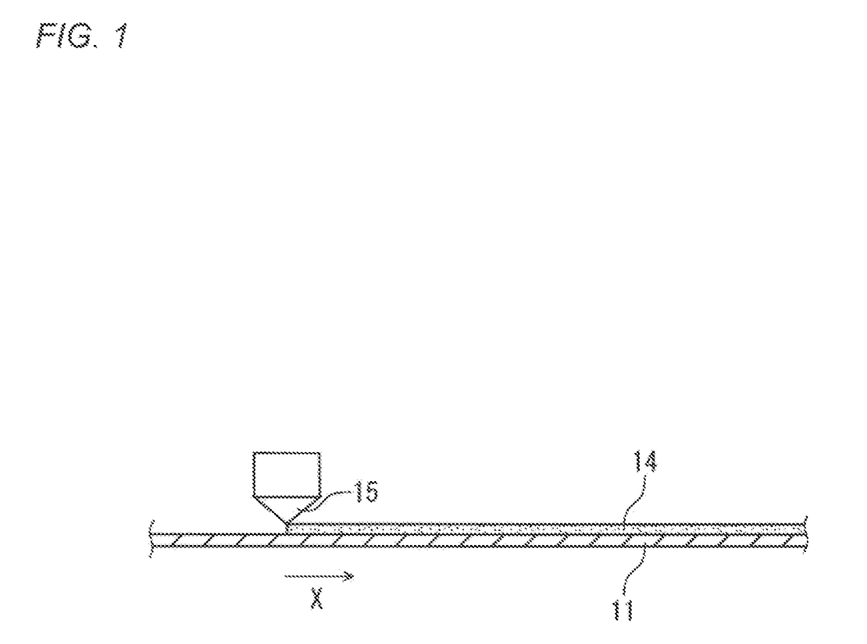
FIG. 1 A schematic view illustrating one example of a step of applying a resin solution containing a deoxidizing resin onto a surface of a positive electrode.

A description will be given of an exemplary process of allowing the deoxidizing resin to be supported on a surface of the positive electrode, with reference to FIG. 1. FIG. 1 is a schematic view illustrating one example of a step of applying a deoxidizing agent-containing resin solution onto a surface of a positive electrode.

As illustrated in FIG. 1, while a belt-shaped positive electrode 11 is conveyed in a direction indicated by the allow X, a deoxidizing agent-containing resin solution 14 is continuously or intermittently applied onto a surface of the positive electrode 11, using a die coater having a nozzle 15. The application is followed by drying, to remove the solvent in the resin solution 14. In this way, a deoxidizing resin layer is formed on the surface of the positive electrode 11. Other than the above, using the die coater, the deoxidizing agent-containing resin solution 14 may be applied onto a surface of a separator.

The resin solution may contain water and a resin that dissolves in water (water-soluble resin), and may contain a non-aqueous solvent and a resin that dissolves in a non-aqueous solvent (water-insoluble resin). Examples of the water-soluble resin include polyvinyl alcohol, polyacrylamide, polyvinylpyrrolidone, polyvinyl methyl ether, and polyethylene glycol.

Examples of the water-insoluble resin includes polymethyl methacrylate, polyethylene terephthalate, polybutylene terephthalate, polyvinylidene fluoride, polyacrylonitrile, polyimide, polyamide, and polytetrafluoroethylene.

The non-aqueous solvent for dissolving a water-insoluble resin therein is, for example, a non-aqueous solvent having a low boiling point, examples of which include N-methyl-2-pyrrolidone, N,N-dimethylacetamide, N,N-dimethylformamide, hexamethylphosphoric triamide, dimethylsulfoxide, and γ-butyrolactone.

In the case of allowing the deoxidizing resin to be supported on a surface of the positive electrode, the solvent in the resin solution (dispersion medium of the deoxidizing resin) may be the same as or different from the dispersion medium contained in the positive electrode slurry.

Furthermore, a deoxidizing sheet formed by processing the deoxidizing resin into a sheet may be placed inside the secondary battery. The deoxidizing sheet can be obtained by, for example, molding a resin composition containing the deoxidizing agent in a sheet form. The molding method includes any known method, such as extrusion molding. The resin composition includes, for example, a thermoplastic resin and a deoxidizing agent. Examples of the thermoplastic resin include a polyolefin, such as polyethylene (low density polyethylene) and polypropylene, and a polystyrene. Preferred among them is a low density polyethylene, in terms of its ease of processing. The resin composition may further contain one or more other additives. For example, an inorganic filler may be used as another additive, for the purpose of increasing the strength of the sheet.

Inside the battery, the deoxidizing sheet (deoxidizing resin) is preferably placed in an amount of, for example, 0.15 mg or more and 4.7 mg or less per 1 mAh of the rated capacity. In this case, while the positive electrode active material and the negative electrode active material can be contained in a sufficient amount for achieving a high capacity, the oxygen stay in the battery can be effectively suppressed.

The deoxidizing sheet may be placed between the positive electrode and the separator. In this case, the deoxidizing agent can easily come in contact with oxygen generated from the positive electrode, and the oxygen stay in the battery can be easily suppressed. A porous deoxidizing sheet can be obtained by extrusion molding and the like, which allows for smooth migration of lithium ions between the positive electrode and the non-aqueous electrolyte. The deoxidizing sheet can also serve as a separator.

Figure 2:
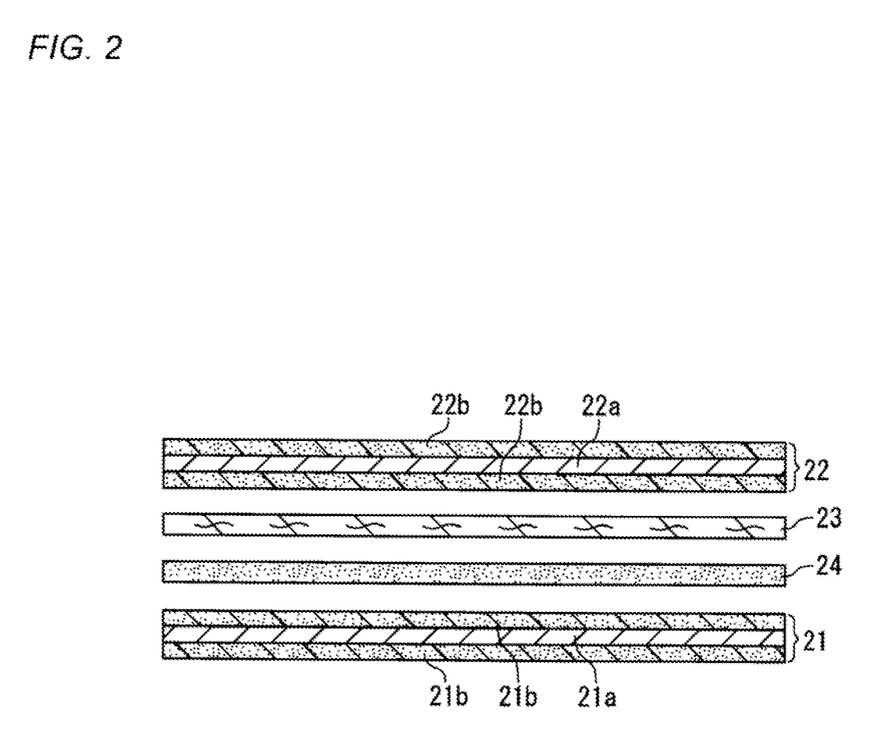
FIG. 2 An exploded cross-sectional view of an essential part of a secondary battery according to one embodiment of the present invention.

A description will be given below of a secondary battery according to one embodiment of the present invention, with reference to FIG. 2. FIG. 2 is an exploded cross-sectional view of an essential part of a secondary battery according to one embodiment of the present invention.

A positive electrode 21 includes a positive electrode current collector 21a, and a positive electrode material mixture layer 21b formed on both surfaces of the positive electrode current collector 21a. A negative electrode 22 includes a negative electrode current collector 22a, and a negative electrode material mixture layer 22b formed on both surfaces of the negative electrode current collector 22a. A separator 23 is disposed between the positive electrode 21 and the negative electrode 22. A deoxidizing sheet 24 is placed between the positive electrode 21 and the separator 23.

The secondary battery may include an electrode group formed by spirally winding the positive electrode and the negative electrode, with the separator interposed therebetween. In this case, a space is formed at the center of the electrode group. Preferably, the deoxidizing resin is packed in the space, and more preferably, the deoxidizing sheet is placed in a wound state within the space. By utilizing the space formed at the center of the electrode group, the deoxidizing resin can be placed inside the battery. Since the dead space at the center of the electrode group can be utilized effectively, and a space for placing the deoxidizing resin therein is not necessary to be provided separately, a battery having a high energy density tends to be obtained.

Figure 3:
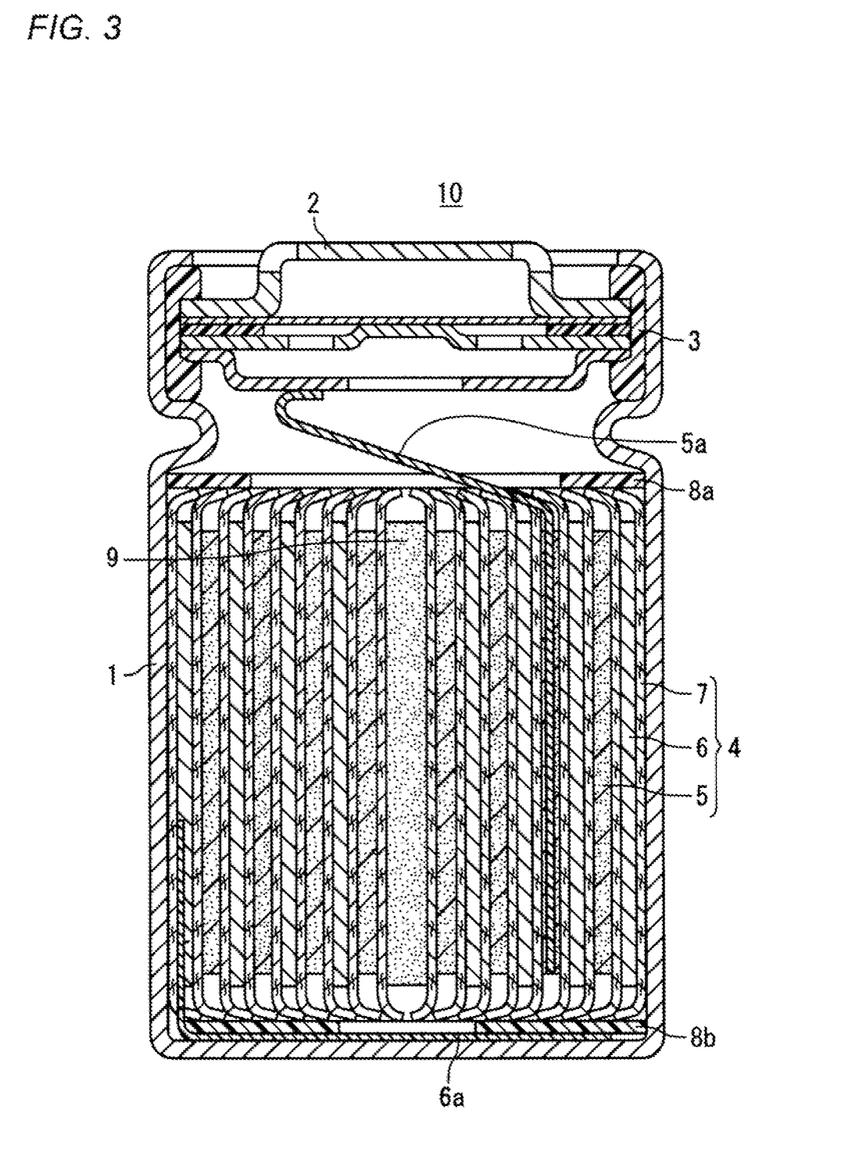
FIG. 3 A vertical cross-sectional view of a secondary battery according to another embodiment of the present invention.

A description will be given below of a secondary battery according to another embodiment of the present invention, with reference to FIG. 3. FIG. 3 is a vertical cross-sectional view of a secondary battery according to another embodiment of the present invention.

In FIG. 3, a secondary battery 10 includes a bottomed battery case 1 having an opening, a sealing plate 2 closing the opening, a gasket 3 interposed between the edge of the opening of the battery case 1 and the sealing plate 2, a wound electrode group 4 housed in the battery case 1, and a non-aqueous electrolyte (not shown) impregnated into the electrode group 4. The electrode group 4 is a wound body in which a belt-shaped positive electrode 5 with a positive electrode lead 5a attached thereto, and a belt-shaped negative electrode 6 with a negative electrode lead 6a attached thereto are wound together, with a separator 7 interposed therebetween. An upper insulating plate 8a and a lower insulating plate 8b are placed respectively on the top and bottom ends of the electrode group 4. One end of the negative electrode lead 6a is welded to battery case 1, and one end of the positive electrode lead 5a is connected to the sealing plate 2. A deoxidizing resin 9 is packed in a space formed at the center of the wound electrode group 4. The packing of the deoxidizing resin 9 is carried out by, for example, placing a wound deoxidizing sheet in the space.

The positive electrode active material may be any known positive electrode active material used in a secondary battery including a non-aqueous electrolyte. In view of achieving a higher capacity and improving the cycle characteristics, the positive electrode active material preferably includes a lithium-containing transition metal oxide having a layered rock-salt type crystal structure. Examples of the lithium-containing transition metal oxide having a layered rock-salt type crystal structure include a lithium cobaltate, an oxide containing lithium, nickel, cobalt and manganese, and an oxide containing lithium, nickel, cobalt and aluminum. Also, the positive electrode active material may include a lithium-containing transition metal oxide having a spinel-type crystal structure, such as lithium manganate.

Examples of the lithium-containing transition metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. Here, M is at least one kind selected from the group consisting of Na, Mg, Ca, Zn, Ga, Ge, Sn, Sc, Ti, V, Cr, Y, Zr, W, Mn, Fe, Co, Ni, Cu, Zn, Al, Cr, Pb, Sb, Bi, and B. Me includes at least a transition element (e.g., Me includes at least one kind selected from the group consisting of Mn, Fe, Co, and Ni). Here, $0.8 \le a \le 1.2$, $0 \le b \le 0.9$, and $2.0 \le c \le 2.3$. The value "a" representing the molar ratio of lithium is a value in a discharged state, which corresponds to a value measured immediately after the production of the active material, and is subjected to increase and decrease during charge and discharge.

The negative electrode active material may be any known negative electrode active material used in a secondary battery including a non-aqueous electrolyte. In view of achieving a higher capacity, the negative electrode active material preferably includes at least one kind selected from the group consisting of a silicon-containing material and a carbon material.

Examples of the carbon material include graphite, graphitizable carbon (soft carbon), and non-graphitizable carbon (hard carbon). Preferred among them is graphite, which is stable during charge and discharge and whose irreversible capacity is small. The graphite means a material having a graphite-like crystal structure, examples of which include natural graphite, artificial graphite, and graphitized mesophase carbon particles. The carbon material may be used singly or in combination of two or more kinds.

Examples of the silicon-containing material include $SiO_x$ ($0<x<2$) containing a $SiO_2$ phase and Si particles dispersed in the $SiO_2$ phase, a composite material (hereinafter, LSX) containing a lithium silicate phase and Si particles dispersed in the lithium silicate phase, and an alloy containing silicon and a metal element other than silicon. The LSX has a smaller irreversible capacity than $SiO_x$ and exhibits a smaller degree of expansion and contraction during charge and discharge. The lithium silicate phase of the LSX can have a composition represented by a formula: $Li_{2y}SiO_{2+y}$, where $0<y<2$.

The silicon-containing material, among the negative electrode active materials, has a high capacity, but on the other hand, has a high irreversible capacity in some cases. Therefore, when using the silicon-containing material, the effect produced by the positive electrode additive, of suppressing the decrease in battery capacity due to the irreversible capacity of the negative electrode tends to be remarkable.

In view of minimizing the influence on the negative electrode associated with the expansion and contraction of the silicon-containing material during charge and discharge, preferred is a combination of the silicon-containing material and the carbon material. In this case, while imparting a high capacity of the Si particles to the negative electrode, it is possible to obtain excellent cycle characteristics. In this case, the ratio of the silicon-containing material to the total of the silicon-containing material and the carbon material is, for example, preferably 1 mass % or more and 25 mass % or less, more preferably 2 mass % or more and 20 mass % or less, further more preferably 5 mass % or more and 15 mass % or less. This makes it easy to achieve both a higher capacity and improved cycle characteristics.

A detailed description will be given below of the configuration of the secondary battery.

Positive Electrode

The positive electrode includes, for example, a positive electrode current collector, and a positive electrode material mixture layer formed on a surface of the positive electrode current collector. The positive electrode material mixture layer can be formed by applying a positive electrode slurry including a positive electrode material mixture dispersed in a dispersion medium, onto a surface of the positive electrode current collector, followed by drying. The applied film after drying may be rolled, if necessary. The positive electrode material mixture layer may be formed on one surface or both surfaces of the positive electrode current collector. The positive electrode material mixture essentially includes a positive electrode active material and a positive electrode additive, and may optionally include a binder, an electrically conductive agent, a thickener, and the like.

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, methyl polyacrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: graphite, such as natural graphite and artificial graphite; carbon blacks, such as the acetylene black; conductive fibers, such as carbon fibers and metal fibers; fluorinated carbon; metal powders, such as aluminum; conductive whiskers, such as zinc oxide and potassium titanate; and organic conductive materials, such as phenylene derivatives. These may be used singly or in combination of two or more kinds.

Examples of the thickener include: cellulose derivatives (e.g., cellulose ethers), such as carboxymethyl cellulose (CMC) and modified products thereof (including salts such as Na salts), and methyl cellulose; saponificated products of polymers having vinyl acetate units, such as polyvinyl alcohol; and polyethers (e.g., polyalkylene oxide, such as polyethylene oxide). These may be used singly or in combination of two or more kinds.

Examples of the positive electrode current collector include a non-porous electrically conductive base material (e.g., metal foil), and a porous electrically conductive base material (e.g., mesh, net, punched sheet). The positive electrode current collector may be made of, for example, stainless steel, aluminum, an aluminum alloy, and titanium. The positive electrode current collector may have any thickness, and is, for example, 3 to 50 μm thick.

The dispersion medium is, although not specifically limited, exemplified by: water; alcohols, such as ethanol; ethers, such as tetrahydrofuran; amides, such as dimethylformamide; N-methyl-2-pyrrolidone (NMP); and a mixed solvent of these.

(Negative Electrode)

The negative electrode includes, for example, a negative electrode current collector, and a negative electrode material mixture layer formed on a surface of the negative electrode current collector. The negative electrode material mixture layer can be formed by applying a negative electrode slurry including a negative electrode material mixture dispersed in a dispersion medium, onto a surface of the negative electrode current collector, followed by drying. The applied film after drying may be rolled, if necessary. The negative electrode material mixture layer may be formed on one surface or both surfaces of the negative electrode current collector. The negative electrode material mixture essentially includes a negative electrode active material, and may optionally include a binder, an electrically conductive agent, a thickener, and the like. Examples of the binder, the thickener, and the dispersion medium are as those exemplified for the positive electrode. Examples of the conductive agent are as those exemplified for the positive electrode, except graphite.

Examples of the negative electrode current collector include a non-porous electrically conductive base material (e.g., metal foil), and a porous electrically conductive base material (e.g., mesh, net, punched sheet). The negative electrode current collector may be made of, for example, stainless steel, nickel, a nickel alloy, copper, and a copper alloy. The negative electrode current collector may have any thickness, and is, for example, 1 to 50 μm thick, in view of balancing between higher strength and lighter weight of the negative electrode.

(Separator)

The separator may be, for example, a resin microporous film, or a resin non-woven or woven fabric. Examples of the resin include polyolefin, polyamide, and polyamide-imide. Examples of the polyolefin include polyethylene and polypropylene.

(Non-Aqueous Electrolyte)

The non-aqueous electrolyte contains a non-aqueous solvent and a lithium salt dissolved in the non-aqueous solvent.

Examples of the non-aqueous solvent include: cyclic carbonic ester, such as propylene carbonate (PC), ethylene carbonate (EC), fluoroethylene carbonate (FEC), and vinylene carbonate (VC); chain carbonic ester, such as diethyl carbonate (DEC), ethyl methyl carbonate (EMC), and dimethyl carbonate (DMC); and cyclic carboxylic acid ester, such as γ-butyrolactone and γ-valerolactone. The non-aqueous solvent may be used singly or in combination of two kinds or more.

Examples of the lithium salt include: $LiPF_6$, $LiBF_4$, $LiClO_4$, $LiAsF_6$, $LiCF_3SO_3$, $LiN(SO_2F)_2$, and $LiN(SO_2CF_3)_2$. The lithium salt may be used singly or in combination of two kinds or more.

The secondary battery may include a wound electrode group formed by winding the positive electrode and the negative electrode, with the separator interposed therebetween, or a stacked electrode group formed by stacking the positive electrode and the negative electrode, with the separator interposed therebetween. The secondary battery may be in any form, such as cylindrical type, prismatic type, coin type, button type, or laminate type.

INDUSTRIAL APPLICABILITY

The secondary battery according to the present disclosure can be used as a driving power source for personal computers, cellular phones, mobile devices, personal digital assistants (PDA), portable game machines, camcorders, and the like, a main or auxiliary driving power source for an electric motor in vehicles, such as hybrid electric cars and plug-in HEVs, and a driving power source for electric power tools, vacuum cleaners, robots, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: battery case, 2: sealing plate, 3: gasket, 4: electrode group, 5a: positive electrode lead, 5: positive electrode, 6a: negative electrode lead, 6: negative electrode, 7: separator, 8a: upper insulating plate, 8b: lower insulating plate, 9: deoxidizing resin, 10: secondary battery, 11: positive electrode, 14: deoxidizing agent-containing resin solution, 15: nozzle, 21: positive electrode, 21a: positive electrode current collector, 21b: positive electrode material mixture layer, 22: negative electrode, 22a: negative electrode current collector, 22b: negative electrode material mixture layer, 23: separator, 24: deoxidizing sheet

The invention claimed is:

1. A secondary battery, comprising:
a positive electrode including a positive electrode active material capable of electrochemically absorbing and releasing lithium ions;
a negative electrode including a negative electrode active material capable of electrochemically absorbing and releasing lithium ions;
a separator interposed between the positive electrode and the negative electrode; and
a non-aqueous electrolyte, wherein
the positive electrode includes a positive electrode material mixture containing the positive electrode active material and a positive electrode additive, the positive electrode additive includes a compound represented by a general formula: $Li_aFe_xM_yO_z$, where $0 \le a \le 5$, $0 \le x \le 5$, $0 \le y \le 1$, and $0 \le z \le 4$, with at least two of a, x, y and z being more than 0, and M includes at least one kind selected from the group consisting of Mn, Zn, Al, Ga, Ge, Ti, Si, Sn, Ce, Y, Zr, S, and Na, a deoxidizing agent is placed inside the secondary battery, and the deoxidizing agent includes at least one kind selected from the group consisting of a cerium oxide, a zeolite, and a Ca—Si alloy; and when cerium oxide is included, an atomic ratio: Ce/Fe of Ce contained in the cerium oxide in the battery to Fe contained in the positive electrode additive in the positive electrode material mixture is 0.1 or more and 80 or less.

2. The secondary battery according to claim 1, wherein a content of the positive electrode additive in the positive electrode material mixture is 0.1 mass % or more and 5 mass % or less with respect to a total mass of the positive electrode material mixture.

3. The secondary battery according to claim 1, wherein the positive electrode additive includes at least one kind selected from the group consisting of $Li_5FeO_4$, $Li_4Fe_4$, $LiFeO_2$, $Li_2O$, and $FeO_2$.

4. The secondary battery according to claim 1, wherein the positive electrode active material includes a lithium-containing transition metal oxide having a layered rock-salt type crystal structure.

5. The secondary battery according to claim 1, wherein the negative electrode active material includes a silicon-containing material.

6. The secondary battery according to claim 1, wherein the cerium oxide is represented by a general formula: $CeO_{2-x}$, where $0<x<2$.

7. The secondary battery according to claim 1, wherein a deoxidizing resin is placed inside the secondary battery, the deoxidizing resin containing a resin that allows oxygen to pass through and the deoxidizing agent dispersed in the resin.

8. The secondary battery according to claim 7, wherein the deoxidizing resin is dispersed in the positive electrode material mixture.

9. The secondary battery according to claim 8, wherein a content of the deoxidizing resin in the positive electrode material mixture is 1 mass % or more and 10 mass % or less with respect to a total mass of the positive electrode active material.

10. The secondary battery according to claim 7, wherein the deoxidizing resin is supported on a surface of the positive electrode or a surface of the separator.

11. The secondary battery according to claim 7, wherein a deoxidizing-sheet formed by processing the deoxidizing resin into a sheet is placed inside the secondary battery.

12. The secondary battery according to claim 11, wherein the deoxidizing sheet is placed in an amount of 0.15 mg or more and 4.7 mg or less per 1 mAh of a rated capacity.

13. The secondary battery according to claim 11, wherein the deoxidizing sheet is placed between the positive electrode and the separator.

14. A secondary battery, comprising:
a positive electrode including a positive electrode active material capable of electrochemically absorbing and releasing lithium ions;
a negative electrode including a negative electrode active material capable of electrochemically absorbing and releasing lithium ions;
a separator interposed between the positive electrode and the negative electrode; and
a non-aqueous electrolyte, wherein
the positive electrode includes a positive electrode material mixture containing the positive electrode active material and a positive electrode additive,
the positive electrode additive includes a compound represented by a general formula: $Li_aFe_xM_yO_z$, where $0 \le a \le 5$, $0 \le x \le 5$, $0 \le y \le 1$, and $0 \le z \le 4$, with at least two of a, x, y and z being more than 0, and M includes at least one kind selected from the group consisting of Mn, Zn, Al, Ga, Ge, Ti, Si, Sn, Ce, Y, Zr, S, and Na,
the positive electrode and the negative electrode are spirally wound with the separator interposed between the positive electrode and the negative electrode, into an electrode group,
a deoxidizing sheet formed by processing a deoxidizing resin into a sheet is placed in a wound state within a space formed at a center of the electrode group, and
the deoxidizing resin contains a resin that allows oxygen to pass through and a deoxidizing agent dispersed in the resin.

* * * * *